(12) United States Patent
Dyer et al.

(10) Patent No.: US 6,725,235 B1
(45) Date of Patent: Apr. 20, 2004

(54) DYNAMIC STATE REPRESENTATION METHOD FOR COMPLEX SYSTEMS

(75) Inventors: Douglas M. Dyer, Indialantic, FL (US); William L. Holt, Cocoa Beach, FL (US); Alexis J. Crovetto, Melbourne, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 0 days.

(21) Appl. No.: 09/401,161

(22) Filed: Sep. 22, 1999

(51) Int. Cl.[7] .............................................. G06F 17/00
(52) U.S. Cl. .................... 707/104.1; 707/100; 707/101; 707/102; 345/866; 714/47; 714/46; 709/224
(58) Field of Search ................................ 707/100, 102, 707/104.1, 101; 345/866; 714/47; 709/224

(56) References Cited

U.S. PATENT DOCUMENTS 6,182,249 B1 * 1/2001 Wookey et al. ............... 714/47
6,198,480 B1 * 3/2001 Cotugno et al. ............ 345/866
6,308,208 B1 * 10/2001 Jung et al. ................... 709/224

OTHER PUBLICATIONS

Booch et al., The Unified Modeling Language User Guide, Copyright 1999 by Addison Wesley Longman, Inc., First printing Oct. 1998, Chapter 20, Events and Signals, pp. 277–286.*

* cited by examiner

*Primary Examiner*—Kim Vu
*Assistant Examiner*—Hung Pham
(74) *Attorney, Agent, or Firm*—Sacco & Associates, PA

(57) ABSTRACT

A method for using a computer system to dynamically represent the state of any device comprising a plurality of sub-systems. The method includes the steps of providing a modeling language for permitting a user to define a hierarchical data structure comprised of a plurality of leaves. Each leaf represents a discrete symbol associated with a sub-system of the device. A parent symbol is similarly defined representing a level of abstraction of the device which is higher in said hierarchy than the plurality of leaves. In response to updated data received for any said leaf symbol, the system automatically determines an updated state of the leaf symbol based on the updated data and automatically propagates the updated state to the parent symbol. Consequently, a state of any device and its sub-systems can be dynamically represented, without the need for customized computer programming, once the hierarchical data structure has been defined by a user.

24 Claims, 24 Drawing Sheets

```
1    ; Define a model that has one structure containing 4 elements
2    sdef_struct "Power", desc = "Power subsystem"
3        sdef_analog "BatVolt1", desc = "Primary battery voltage"
4        sdef_analog "BatTemp1", desc = "Primary battery temperature"
5        sdef_analog "PanCur", desc = "Solar panel charging current", coef =
6            55.0 & 3.77, units = mA
7        sdef_analog "PanVolt", desc = "Solar panel voltage"
8    sdef_end "Power"
```

Fig. 3

| Datatype | Description |
|---|---|
| Composite | Structures and Arrays. Contain state (ie: timestamps, alarm states, etc). |
| String | A string datatype with the same string rules as in C. I.e.: Users will null-terminate them, and know that a 0, when encountered, would stop a SYM_Put or Get, signifying the end of the string. |
| Integer | An attribute would further qualify the style of the integer:<br>· Unsigned char (uint8)<br>· Char (int8)<br>· Unsigned short (uint16)<br>· Short (int16)<br>· Unsigned int (uint32)<br>· Int (int32) |
| Real | An attribute would further qualify the style of the real:<br>· Float (float32)<br>· Double (float64) |
| Analog | Always a Double64 with coefficients and a conversion process. Has an attribute to qualify the style of the raw input:<br>· Unsigned int (uint32)<br>· Int (int32) |
| Time | POSIX time structure |
| Discrete | Always a uint32 internally, maintains states. |
| User | A user datatype where the DLL that implements specific datatype methods will be supplied at definition time. Ie: symbol name=x, type=user, dll=mydll. |

Fig. 4

| Directive | Parameter | Specified | Type | Description |
|---|---|---|---|---|
| SDEF_STRUCT | NAME | Required | Str | 31 character name of the structure. To signify a single-dimension array, use C-style notation: *myarray[34]* |
| | DESC | | Str | 40 character description |
| | UNITS | | Str | 31 character string. Qualifier as to the symbol's unit type |
| | NOMCOLOR | | Int | Color code for the structure's nominal color. This will default if not set. |
| | PROPAGATE | | Set | Determines if symbol will propagate any state to its parent:<br>· TIME<br>· ALARM<br>· ALL (default)<br>· NONE |
| | TELEMETERED | | Key | The symbol will have telemetered attributes. If any telemetry flags are defined, this is implicitly set. |
| | INVALID | | Key | Marks this structure and all of its contents as being invalid. |
| | OFFLINE | | Key | Marks this structure and all of its contents as being offline. |
| | WARNCOLOR | | Int | A telemetered value, the color code for when the structure is in a warning condition. This will default if not set. |
| | CRITCOLOR | | Int | A telemetered value, the color code for when the structure is in a critical condition. This will default if not set. |
| | INVCOLOR | | Int | A telemetered value, the color code for when the structure is marked invalid. This will default if not set. |
| | OFFCOLOR | | Int | A telemetered value, the color code for when the structure is marked offline. This will default if not set. |

Fig. 5A

| Directive | Parameter | Specified | Type | Description |
|---|---|---|---|---|
| *SDEF_STRING* | NAME | Required | Str | 31 character name of the string. To signify a single-dimension array, use C-style notation: *myarray[34]* |
| | DESC | | Str | 40 character description |
| | UNITS | | Str | 31 character string. Qualifier as to the symbol's unit type |
| | INITIAL | | Str lst | Initial value. If this is an array of strings, the initial value may take on a list: INITIAL = "Hello" & "world" & ... |
| | LENGTH | Required | Int | Maximum length of string (including the NULL terminator). |
| | PROPAGATE | | Set | Determines if symbol will propagate any state to its parent:<br>· TIME<br>· ALL (default)<br>· NONE |
| | NOMCOLOR | | Int | Color code for the string's nominal color. This will default if not set. |
| | DISTRIBUTE | | Flag | Configure the distribution of this symbol (as CHNG messages):<br>· NEVER<br>· CHANGE (default)<br>· ALWAYS |
| *SDEF_INTEGER* | NAME | Required | Str | 31 character name of the integer. To signify a single-dimension array, use C-style notation: *myarray[34]* |
| | DESC | | Str | 40 character description |
| | UNITS | | Str | 31 character string. Qualifier as to the symbol's unit type |
| | TYPE | | Set | Integer types:<br>· Int8<br>· Uint8<br>· Int16<br>· Uint16<br>· Int32<br>· Uint32 (default) |

Fig. 5B

| Directive | Parameter | Spec-ified | Type | Description |
|---|---|---|---|---|
| SDEF_INTEGER (continued) | INITIAL | | Int lst | Initial value. Initial value. If this is an array of ints, the initial value may take on a list: INITIAL = 423 & 3 & ... |
| | DISTRI-BUTE | | Set | Configure the distribution of this symbol (as CHNG messages): <br> · NEVER <br> · CHANGE (default) <br> · ALWAYS |
| | PROPA-GATE | | Set | Determines if symbol will propagate any state to its parent: <br> · TIME <br> · ALARM <br> · ALL (default) <br> · NONE |
| | APPATTRS | | Key | The symbol will have application attributes. If any application flag is defined, this is implicitly set. |
| | APPFLAG[01-08] | | Bool | Assign any of 8 application flags |
| | APPINT[01-02] | | Int | Assign any of 2 application integers |
| | NOMCOLOR | | Int | Color code for the integer's nominal color. This will default if not set. |
| | TELE-METERED | | Key | The symbol will have telemetered attributes. If any telemetry flags are defined, this is implicitly set. |
| | INVALID | | Key | Marks this symbol as being invalid. |
| | OFFLINE | | Key | Marks this symbol as being offline. |
| | WARN-COLOR | | Int | A telemetered value, the color code for when the integer is in a warning condition. This will default if not set. |
| | CRITCOLOR | | Int | A telemetered value, the color code for when the integer is in a critical condition. This will default if not set. |

Fig. 5C

| Directive | Parameter | Specified | Type | Description |
|---|---|---|---|---|
| SDEF_INTEGER (continued) | INVCOLOR | | Int | A telemetered value, the color code for when the integer is marked invalid. This will default if not set. |
| | OFFCOLOR | | Int | A telemetered value, the color code for when the integer is marked offline. This will default if not set. |
| | UNREAS-COLOR | | Int | A telemetered value, the color code for when the integer had a value update that was outside the reasonability limit. This will default if not set. |
| | LIMIT_LOW_IN | | Int | Low limit in |
| | LIMIT_LOW_OUT | | Int | Low limit out |
| | LIMIT_HIGH_IN | | Int | High limit in |
| | LIMIT_HIGH_OUT | | Int | High limit out |
| | REAS_LOW | | Int | Low reasonability limit |
| | REAS_HIGH | | Int | High reasonability limit |
| | USERID | | Int | User-supplied identifier for this symbol. |
| | ALARMS | | Flag | Configure the emitting of alarms:<br>· ON (default)<br>· OFF |
| | CAL | | Int | Consecutive alarm limit |
| | APERTURE | | Int | Aperture to determine if a SYM_PUT will be performed (if not, no attribute of the symbol will have been affected). Defaults to 1. |
| SDEF_REAL | NAME | Required | Str | 31 character name of the real. To signify a single-dimension array, use C-style notation: *myarray[34]* |
| | DESC | | Str | 40 character description |
| | UNITS | | Str | 31 character string. Qualifier as to the symbol's unit type |

Fig. 5D

| Directive | Parameter | Spec-ified | Type | Description |
|---|---|---|---|---|
| *SDEF_REAL* (continued) | TYPE | | Set | Real type:<br>· FLOAT32<br>· DOUBLE64 (default) |
| | INITIAL | | Dbl lst | Initial value. If this is an array of reals, the initial value may take on a list:<br>INITIAL = 4.23 & 0.3 & ... |
| | DISTRI-BUTE | | Set | Configure the distribution of this symbol (as CHNG messages):<br>· NEVER<br>· CHANGE (default)<br>· ALWAYS |
| | PROPA-GATE | | Set | Determines if symbol will propagate any state to its parent:<br>· TIME<br>· ALARM<br>· ALL (default)<br>· NONE |
| | APPATTRS | | Key | The symbol will have application attributes. If any application flag is defined, this is implicitly set. |
| | APPFLAG[01-08] | | Bool | Assign any of 8 application flags |
| | APPINT[01-02] | | Int | Assign any of 2 application integers |
| | NOMCOLOR | | Int | Color code for the real's nominal color. This will default if not set. |
| | TELE-METERED | | Key | The symbol will have telemetered attributes. If any telemetry flags are defined, this is implicitly set. |
| | INVALID | | Key | Marks this symbol as being invalid. |
| | OFFLINE | | Key | Marks this symbol as being offline. |
| | WARN-COLOR | | Int | A telemetered value, the color code for when the real is in a warning condition. This will default if not set. |
| | CRITCOLOR | | Int | A telemetered value, the color code for when the real is in a critical condition. This will default if not set. |

Fig. 5E

| Directive | Parameter | Specified | Type | Description |
|---|---|---|---|---|
| SDEF_REAL (continued) | INVCOLOR | | Int | A telemetered value, the color code for when the real is marked invalid. This will default if not set. |
| | OFFCOLOR | | Int | A telemetered value, the color code for when the real is marked offline. This will default if not set. |
| | UNREAS-COLOR | | Int | A telemetered value, the color code for when the real had a value update that was outside the reasonability limit. This will default if not set. |
| | USERID | | Int | User-supplied identifier for this symbol. |
| | LIMIT_LOW_IN | | Dbl | Low limit in |
| | LIMIT_LOW_OUT | | Dbl | Low limit out |
| | LIMIT_HIGH_IN | | Dbl | High limit in |
| | LIMIT_HIGH_OUT | | Dbl | High limit out |
| | REAS_LOW | | Dbl | Low reasonability limit |
| | REAS_HIGH | | Dbl | High reasonability limit |
| | ALARMS | | Flag | Configure the emitting of alarms:<br>• ON (default)<br>• OFF |
| | CAL | | Int | Consecutive alarm limit |
| SDEF_ANALOG | NAME | Required | Str | 31 character name of the analog. To signify a single-dimension array, use C-style notation: *myarray[34]* |
| | DESC | | Str | 40 character description |
| | UNITS | | Str | 31 character string. Qualifier as to the symbol's unit type |
| | TYPE | | Set | Analog type (Raw input choices):<br>• Uint32 (default)<br>• Int32 |
| | INITIAL | | Dbl lst | Initial value. If this is an array of analogs, the initial value may take on a list:<br>INITIAL = 4.23 & 0.3 & ... |

Fig. 5F

| Directive | Parameter | Spec-ified | Type | Description |
|---|---|---|---|---|
| SDEF_ANALOG (continued) | COEF | Required | Flt Lst | Specifies the coefficients. The lowest-order coefficient is specified first (C0X0 + C1X1 + C2X2 + ... + C7X7). Example: 2.3 & 1.0 |
| | DISTRI-BUTE | | Set | Configure the distribution of this symbol (as CHNG messages):<br>· NEVER<br>· CHANGED (default)<br>· ALWAYS |
| | PROPA-GATE | | Set | Determines if symbol will propagate any state to its parent:<br>· TIME<br>· ALARM<br>· ALL (default)<br>· NONE |
| | APPATTRS | | Key | The symbol will have application attributes. If any application flag is defined, this is implicitly set. |
| | APPFLAG[01-08] | | Bool | Assign any of 8 application flags |
| | APPINT[01-02] | | Int | Assign any of 2 application integers |
| | NOMCOLOR | | Int | Color code for the analog's nominal color. This will default if not set. |
| | TELE-METERED | | Key | The symbol will have telemetered attributes. If any telemetry flags are defined, this is implicitly set. |
| | INVALID | | Key | Marks this symbol as being invalid. |
| | OFFLINE | | Key | Marks this symbol as being offline. |
| | WARN-COLOR | | Int | A telemetered value, the color code for when the analog is in a warning condition. This will default if not set. |
| | CRITCOLOR | | Int | A telemetered value, the color code for when the analog is in a critical condition. This will default if not set. |

Fig. 5G

| Directive | Parameter | Specified | Type | Description |
|---|---|---|---|---|
| SDEF_ANALOG (continued) | INVCOLOR | | Int | A telemetered value, the color code for when the analog is marked invalid. This will default if not set. |
| | OFFCOLOR | | Int | A telemetered value, the color code for when the analog is marked offline. This will default if not set. |
| | UNREAS-COLOR | | Int | A telemetered value, the color code for when the analog had a value update that was outside the reasonability limit. This will default if not set. |
| | USERID | | Int | User-supplied identifier for this symbol. |
| | LIMIT_LOW_IN | | Dbl | Low limit in |
| | LIMIT_LOW_OUT | | Dbl | Low limit out |
| | LIMIT_HIGH_IN | | Dbl | High limit in |
| | LIMIT_HIGH_OUT | | Dbl | High limit out |
| | REAS_LOW | | Dbl | Low reasonability limit |
| | REAS_HIGH | | Dbl | High reasonability limit |
| | ALARMS | | Flag | Configure the emitting of alarms:<br>· ON (default)<br>· OFF |
| | CAL | | Int | Consecutive alarm limit |
| | APERTURE | | Int | Aperture to determine if a SYM_PUT will be performed (if not, no attribute of the symbol will have been affected). Defaults to 1. |
| SDEF_TIME | NAME | Required | Str | 31 character name of the time symbol. To signify a single-dimension array, use C-style notation:<br>*myarray[34]* |
| | DESC | | Str | 40 character description |
| | UNITS | | Str | 31 character string. Qualifier as to the symbol's unit type |

Fig. 5H

| Directive | Parameter | Specified | Type | Description |
|---|---|---|---|---|
| SDEF_TIME (continued) | PROPA-GATE | | Set | Determines if symbol will propagate any state to its parent:<br>· TIME<br>· ALL (default)<br>· NONE |
| | NOMCOLOR | | Int | Color code for the time's nominal color. This will default if not set. |
| | DISTRIBUTE | | Set | Configure the distribution of this symbol (as CHNG messages):<br>· NEVER<br>· CHANGED (default)<br>· ALWAYS |
| SDEF_DIS-CRETE | NAME | Required | Str | 31 character name of the discrete. This statement is then followed by a series of SDEF_STATE statements to add states (at least one), followed by an SDEF_END. To signify a single-dimension array, use C-style notation:<br>*myarray[34]* |
| | DESC | | Str | 40 character description |
| | UNITS | | Str | 31 character string. Qualifier as to the symbol's unit type |
| | DISTRIBUTE | | Set | Configure the distribution of this symbol (as CHNG messages):<br>· NEVER<br>· CHANGE (default)<br>· ALWAYS |
| | PROPA-GATE | | Set | Determines if symbol will propagate any state to its parent:<br>· TIME<br>· ALARM<br>· ALL (default)<br>· NONE |
| | OPENSET | | Key | If set, this symbol may have a raw value assigned to it that has no corresponding state. In these cases, the state name will be "??" and the symbol alarm state will be retained from its previous value. |

Fig. 5I

| Directive | Parameter | Specified | Type | Description |
|---|---|---|---|---|
| *SDEF_DIS-CRETE* (continued) | APPATTRS | | Key | The symbol will have application attributes. If any application flag is defined, this is implicitly set. |
| | APPFLAG[01-08] | | Bool | Assign any of 8 application flags |
| | APPINT[01-02] | | Int | Assign any of 2 application integers |
| | TELEMET-ERED | | Key | The symbol will have telemetered attributes. If any telemetry flags are defined, this is implicitly set. |
| | INVALID | | Key | Marks this symbol as being invalid. |
| | OFFLINE | | Key | Marks this symbol as being offline. |
| | WARN-COLOR | | Int | A telemetered value, the color code for when the discrete is in a warning condition. This will default if not set. |
| | CRITCOLOR | | Int | A telemetered value, the color code for when the discrete is in a critical condition. This will default if not set. |
| | INVCOLOR | | Int | A telemetered value, the color code for when the discrete is marked invalid. This will default if not set. |
| | OFFCOLOR | | Int | A telemetered value, the color code for when the discrete is marked offline. This will default if not set. |
| | USERID | | Int | User-supplied identifier for this symbol. |
| | ALARMS | | Flag | Configure the emitting of alarms:<br>· ON (default)<br>· OFF |
| | CAL | | Int | Consecutive alarm limit |
| *SDEF_STATE* | NAME | Required | Str | Name of the state. Must be within an SDEF_DISCRETE and an SDEF_END. This directive adds a state to the user discrete symbol. |

Fig. 5J

| Directive | Parameter | Specified | Type | Description |
|---|---|---|---|---|
| | CONDITION | | Set | May be one of the following:<br>· NOMINAL (default)<br>· WARNING<br>· CRITICAL |
| | VALUE | | Int | The raw value corresponding to this state. If not supplied, a default value will be chosen in an enumerated fashion. If this value is not unique for states defined within the discrete, an error will occur. |
| | NOMCOLOR | | Int | Color code for the state's nominal color. This will default if not set. |
| SDEF_END | NAME | Required | Str | Name of the structure or grouping that is ending |

Fig. 5K

```
1    ;Power information
2    sdef_struct "Power"
3        sdef_analog "BatVolt1"
4        sdef_analog "BatTemp1"
5        sdef_Analog "PanCur", limit_low_out = 85.3, limit_low_in 90,
6            limit_high_in 95, limit_high_out = 100.0,
7        sdef_analog "PanVolt", limit_low_out = 75.0, limit_high_out = 80.0,
8    sdef_end "Power"

9    ;An array of three camera information structures
10   sdef_struct "Camera[3]"
11       sdef_discrete "Active"
12           sdef_state "Yes", value = 1
13           sdef_state "No", value = 0
14       sdef_end "active"

15       sdef_integer "LensFilter"
16       sdef_integer "PictsTaken"
17   sdef_end "camera[3]"

18   ;Software statistics information
19   sdef_struct "Software"
20       sdef_struct "CmdInfo"
21           sdef_integer CmdsRcvd
22           sdef_integer CmdsAccepted
23           sdef_integer CmdsAborted
24           sdef_integer CmdsRejected, limit_high_out = 100
25       sdef_end "CmdInfo"

26       sdef_integer "TlmFramesSent"
27       sdef_time "Time"
28   sdef_end "Software"
```

Fig. 6

DYNAMIC STATE REPRESENTATION METHOD FOR COMPLEX SYSTEMS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention describes a method for dynamically tracking the state of a device and it's subcomponents based on the values of data elements.

2. Description of the Related Art

The state of individual components that comprise a complex device such as a space vehicle are traditionally captured onboard the vehicle, digitized, and transmitted to a ground station. State values for a number of individual components on the vehicle may be transmitted to the ground for monitoring the health and status of the vehicle. Although the state of many individual components is transmitted to the ground, no data is transmitted to describe the relationships of these telemetered data to each other. Also, since telemetry values typically come from actual measurements of physical component parts, no telemetry data is generally transmitted that directly indicates the state of higher order logical components.

For example, it may be desirable to know the state of a power component. Since the power component is in reality an assembly of sub-components (primary battery voltage, primary battery temperature, solar panel charging current, solar panel voltage, etc) there is no telemetry item that indicates the overall state of the power component itself. To determine the state of the power component, the operator/engineer would have to look at numerous sub-component indicators simultaneously and make an overall assessment. This is usually accomplished through custom software that is written for a particular satellite or satellite component. However, design and implementation of such custom software tends to be time consuming and costly. Accordingly, the present invention is intended to provide a simple and inexpensive system to permit a user to capture component/sub-component relationships.

SUMMARY OF THE INVENTION

The invention captures component/sub-component relationships in a hierarchical model of data elements. The relationships are captured as the user defines each element of the data model for the system. The invention includes a language and syntax that allows the user to specify all attributes of each individual data element including hierarchical relationships. The language allows the user to add logical composite elements to the data model as well as actual data elements. Additionally, the language allows the user to specify whether or not the state of any element is automatically propagated to its parent composite element.

The method includes the steps of providing the modeling language for permitting a user to define a hierarchical data structure comprised of a plurality of leaves. Each leaf represents a discrete symbol associated with a sub-system of the device. A parent symbol is similarly defined which represents a level of abstraction of the device which is higher in the hierarchy than the plurality of leaves. In response to updated data received for any leaf symbol, the system automatically determines an updated state of the leaf symbol based on the updated data and automatically propagates the updated state to the parent symbol. Consequently, a state of any device and its sub-systems can be dynamically represented, without the need for customized computer programming, once the hierarchical data structure has been defined by a user.

Using the language as described herein, an engineer can assemble a logical data model that accurately reflects the state of symbol data for a vehicle such as a satellite and all of its' sub-assemblies. The system in one embodiment can include a compiler that compiles the user's description of the model into an actual set of binary objects that respond to incoming real-time and/or playback telemetry values to provide state information about the satellite and its components at run-time.

User applications, such as a graphical model browser can use the hierarchical state information to make it easier for operators/engineers to monitor the health and status of a complex system such as a space vehicle. The hierarchical relationships and state information are easily tied to visual properties of standard graphical widgets such as tree views and can be color-coded for easy identification. Such a graphical model browser allows the user to monitor device state at a higher level of abstraction (for example: the power component). But, it also allows him/her to follow status information downwardly through the hierarchy by using visual queues to identify lower level sub-components that are driving the state of a higher level component. Since hierarchical relationships and state propagation characteristics are captured at model definition time, no special software needs to be developed for each new satellite or sub-component.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 3 is an example of a user description of a logical model based upon the 0 example of FIGS. 1 and 2.

FIG. 4 is a set of data types for use with the invention.

FIG. 5A through 5K are a set of language commands or directives for use with the invention.

FIG. 6 is a second example of a user description of a logical model.

DETAILED DESCRIPTION OF THE INVENTION

The invention shall be described herein relative to a space vehicle system sending telemetered data to an earth station. It should be understood however, that the invention is not limited in this regard and can be used with any complex system providing data from a plurality of subsystems.

Figure 1:
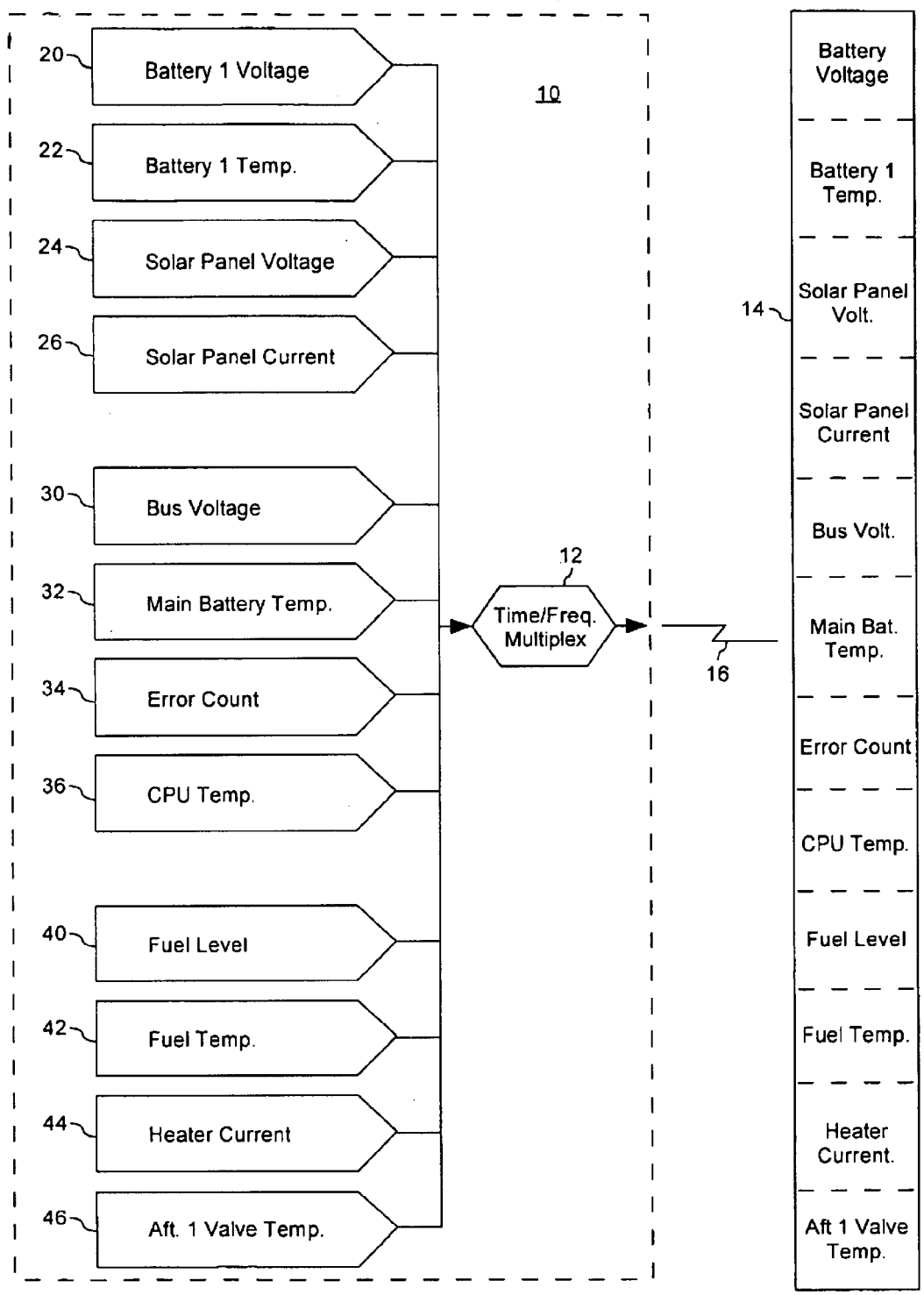
FIG. 1 is a block diagram showing a set of spacecraft components sending telemetry data to a ground station.

FIG. 1 is a block diagram showing a typical space vehicle to ground station telemetry link wherein the space vehicle 10 includes a variety of telemetry sources 20, 22, 24, 26, 30, 32, 34, 36, 40, 42, 44, and 46. The state of individual spacecraft components are electronically captured by suitable transducers onboard the vehicle 10, digitized, and transmitted to the ground station 14 as telemetry via a communication link 16. As is conventional for such systems, the telemetry can be transmitted on multiple channels and can be time multiplexed suitable processing associated with time and frequency multiplexer 12. The data thus transmitted represents the health and status of the space vehicle 10.

It should be noted that only the state of the various individual spacecraft components represented by telemetry sources 20, 22, 24, 26, 30, 32, 34, 36, 40, 42, 44, and 46 in FIG. 1 are transmitted to the ground station 14. No data is typically provided to describe the relationships of the telemetered data to one another in any meaningful way. Thus, independent sets of telemetry data are received by ground station 14 with no particular association to a an overall spacecraft system or subsystem.

In conventional ground station systems, custom computer code is often written by application developers to present the telemetered data to a user in a meaningful way. For example, such custom computer code could provide means for evaluating telemetry data from selected components and presenting a graphical user interface representing the overall state of one or more spacecraft subsystems. By comparison, the present system avoids such expensive custom computer coding.

Referring now to FIGS. 4 and 5, an example is provided of a language and syntax that allows a user to specify all attributes of each individual data element, including hierarchical relationships. Using the language as described herein, an engineer or other user can assemble a logical data model that accurately reflects the state of a particular satellite or device, for example, and all of its sub-assemblies. The system can include a compiler that compiles the user's description of the model into an actual set of binary objects that respond to incoming real-time and/or playback data values to provide state information about the satellite or device and its components at run-time.

FIG. 4 lists the data types which can be used to build the hierarchical model definition. As shown therein, these can include composite, string, integer, real, analog, time, discrete and user data types. The various features and attributes of these data types are shown in FIG. 4. A composite datatype, as that term is used herein, is a collection of other symbols (such as an array or structure).

FIG. 5 shows a set of language commands, each corresponding to each of the data types. The language commands are SDEF_STRUCT, SDEF_STRING, SDEF_INTEGER, SDEF_REAL, SDEF_ANALOG, SDEF_TIME, SDEF_DISCRETE and SDEF_STATE, SDEF_END. The SDEF_STRUCT command identifies a composite data structure which can include any of the various data types described in FIG. 4 as children within its hierarchical structure. The SDEF_STRUCT command is used to identify a particular hierarchical model which can include several different data types.

The language commands SDEF_STRING, SDEF_INTEGER, SDEF_REAL, SDEF_ANALOG, SDEF_TIME, SDEF_DISCRETE each respectively correspond to a particular type of symbol data within the hierarchical model which is to be monitored. Thus, SDEF_STRING refers to a string data type, SDEF_INTEGER refers to an integer data type, SDEF_REAL refers to a real data type (floating-point (43.32, 0.345), SDEF_ANALOG refers to an analog data type, SDEF_TIME refers to a time data type, and SDEF_DISCRETE refers to a discrete data type. These language commands are used to build up a model for a set of symbols which are to be monitored within a hierarchical structure. It should be noted that the datatypes shown in FIG. 4 are merely exemplary and the invention is not limited in this regard.

As shown in FIG. 5, each language command or directive can include a plurality of parameters which control specific command features. These various parameters are fully set forth in FIG. 5 and are used to define various aspects of the data such its name (NAME), a description (DESC), units (UNITS), a subset of the data type (TYPE), its initial value (INITIAL), application attributes, as well as limit values such as LIMIT_LOW_IN, LIMIT_LOW_OUT, REAS_LOW.

Of particular significance for the purpose of the present invention is the "propagate" parameter included for each of the data types SDEF_STRING, SDEF_INTEGER, SDEF_REAL, SDEF_ANALOG, SDEF_TIME, SDEF_DISCRETE. The propagate parameter defines whether the state of a symbol represented within the model by the language command will propagate its current state to its parent. The propagate parameter preferably defaults to a condition wherein all state information is propagated to the parent of the symbol within the hierarchical model. Thus, in a hierarchical model which has been defined with the present system, the root would reflect the status or state of its worst condition leaf within the hierarchy. As shown in FIG. 5, the propagate parameter can preferably be user selected so that only certain conditions will be propagated upwardly, such as an alarm, time or other fault condition. Alternatively, the propagate parameter can be set so that for certain symbols defined within the hierarchy, none of the state information is propagated.

Another important parameter in FIG. 5 are those which concern the appearance codes for a symbol represented within the hierarchical model. For example, the SDEF_INTEGER directive has a parameter NOMCOLOR which defines the nominal color for the hierarchical representation for the integer representation of a symbol in the hierarchical model. This will set the symbol's nominal color or appearance within the hierarchical model. Additional parameters WARNCOLOR, CRITCOLOR, INVCOLOR, OFFCOLOR and UNREASCOLOR are provided to change the color the symbol as represented in the hierarchical model. These particular parameters define how the symbol representation within the model will be altered in appearance when the integer is (respectively) in a warning condition, critical condition, is an invalid value, is marked offline, or has a value which is outside the reasonability limit.

In a preferred embodiment, the symbol appearance is altered by changing a color in which the symbol is displayed to a user. For example, a nominal value can be green, a warning value can be yellow and a critical condition can be shown in red. Those skilled in the art will appreciate that while a color alteration is a preferred method to alter the appearance, there are a variety of other means for altering the appearance of a symbol representation. For example, a symbol could be shown in bold, greyed out, or flashing to change its appearance.

In FIG. 5, it should be noted that not all data types necessarily include appearance parameters and/or range parameters. In the example shown in FIG. 5, it may be noted that the SDEF_STRING parameter is not provided with a warning or critical color. In this regard, it will be appreciated that certain symbols or data types such as strings and time stamps are not likely to have an associated warning condition. By comparison, integers, real, and analog data types typically have a pre-defined range of nominal values and an associated range or warning condition. In any case, the invention is not limited in this regard and the programmer can determine which data types are most suited for inclusion of appearance parameters.

By making use of the foregoing language and syntax, it is possible to efficiently create hierarchical models which can be used for monitoring and displaying the state of a plurality of subsystems which comprise a larger overall system. The example of FIGS. 1–3 is useful to explain how the foregoing system can be used.

Figure 2:
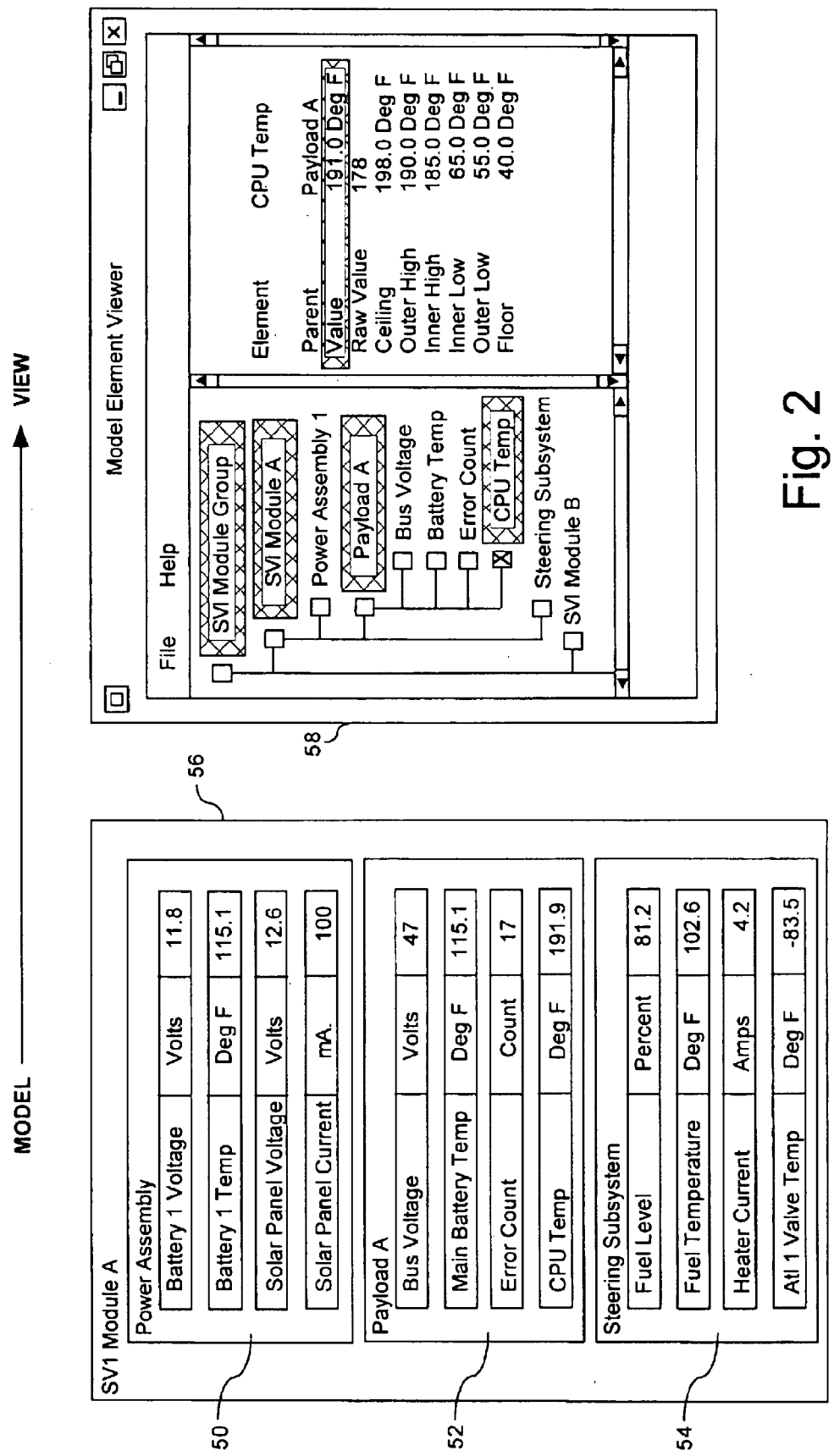
FIG. 2 is a diagram showing usage of a hierarchical model based on the components in FIG. 1.

FIG. 2 is a diagram showing dynamic hierarchical model usage in accordance with a preferred embodiment of the invention. In particular, FIG. 2 is an example of how a user might define a composite model 56 which corresponds to a high level logical construct or view representing one or more spacecraft subsystems. As referred to herein, a high level logical construct refers to a hierarchical representation of any related group of system components which are convenient to view as a single sub-system. Model 56 is a conceptual table which organizes the sub-systems of vehicle 10. FIG. 2 also includes a view 58 which is a computer graphical user interface representation of the model 56 which can be generated using the modeling language of FIGS. 4 and 5.

In the example of FIGS. 1 and 2, a power subsystem on the space vehicle 10 can be composed of a battery and a solar panel that charges the battery. Accordingly a user who wants to be able to monitor the overall status of the power subsystem can create a logical composite element 50 named Power Assembly. In this case, the high level logical construct can include telemetry data from sources 20, 22, 24, 26 respectively representing battery 1 voltage, battery 1 temperature, solar panel voltage and solar panel current.

Similarly, a payload subsystem 52 can be comprised of data from telemetry sources 30, 32, 34, 36 respectively representing bus voltage, main battery temperature, error count and CPU temperature. Finally, a steering subsystem 54 can be comprised of telemetry data from sources 40, 42, 44, and 46 respectively representing fuel level, fuel temperature, heater current, and valve temperature. It will be appreciated that the foregoing sub-systems are merely exemplary in nature and are preferably user defined as may be appropriate to best conceptualize a set of components into a related group of equipment. For the purpose of the present example, it will be assumed that the user has adopted the model show in FIG. 2.

By defining the logical composite elements 50, 52, 54 in the model 56 of FIG. 2 as described above and making use of the hierarchical model description language described in FIGS. 4 and 5, the user can create a high level logical construct or view 58 of FIG. 2. The invention is designed so that the model description thus defined can be conveniently monitored by a generic graphical user interface. An operator/engineer can then monitor the overall health of the power subsystem by looking at a single high level construct named "Power Assembly".

The view 58 in FIG. 2 demonstrates how propagated alarm states from a user defined model 56 can be used. In this example, CPU temperature defined in the model is out of limits in the Payload A module. The alarm propagation attribute for CPU temperature has been set in the model to propagate alarm state up to it's parent element (Payload A). Payload A propagates the alarm state up to it's parent SV1 Module A. Since SV1 Module A is a member of the SV1 Model Group the model propagates the alarm state to the group level. Parent and child model elements are changed in appearance (for example displayed in a different color) to indicate the alarm condition.

As show in FIG. 2, the view 58 of the high level logical construct illustrates that the alarm state of each component will be determined dynamically by the states of the lower level sub-components that comprise it. The state of each of the symbols comprising the lower level components propagates from each leaf of the structure to its parent and ultimately to a root. As long as the values of all sub-components are within nominal range, no fault, error or warning condition will be propagated upwardly and the parent element's alarm state will be nominal. If any sub-component's value exceeds user defined alarm limits, it's state will change to reflect the problem condition and that state will automatically propagate up to the parent composite element.

FIG. 3 is an example of a section of code using the language and syntax of FIGS. 4 and 5 to define a hierarchical model for the power assembly module 50 in FIG. 2. Line 1 is a comment line explaining that the code section defines a model that has one structure containing four elements. Line 2 identifies a composite data type using the SDEF_STRUCT directive. The name parameter for the SDEF_STRUCT directive in this case is "Power" and the description indicates that this particular code section is modeling the power subsystem. Lines 3–6 list further directives using the analog data type directive SDEF_ANALOG to model the various symbols generated from the Power Assembly module 50. Line 7 is an SDEF_END directive indicating that the model definition is complete. For the purpose of simplicity, the hierarchical model defined in FIG. 3 does not include specific upper and lower symbol range limitations. Accordingly, a displayed symbol will not change in appearance under any fault condition.

According to a preferred embodiment, the critical and warning states are pre-defined as part of the system model. For example, for an integer value, if the values are defined 0–10 to be critical, 11–20 to be warning, 80–90 to be warning, and 91–100 to be critical, then the warning and critical limits can be defined as:

Sdef_integer test, limit_low_out=10, limit_low_in=20, limit_high_in=80, limit_high_out=91.

Thus, in each case, low and high values signify whether the model is describing the lower limit values or high end limit values. The "in" and "out" values represent the warning and critical levels, respectively. Below is a list showing the relationship between the limit definitions and the symbol appearance parameters:

<value would be critical>
    HIGH_OUT
<value would be warning>
    HIGH_IN
<value would be normal>
    LOW_IN
<value would be warning>
    LOW_OUT
<value would be critical>

Figure 7:
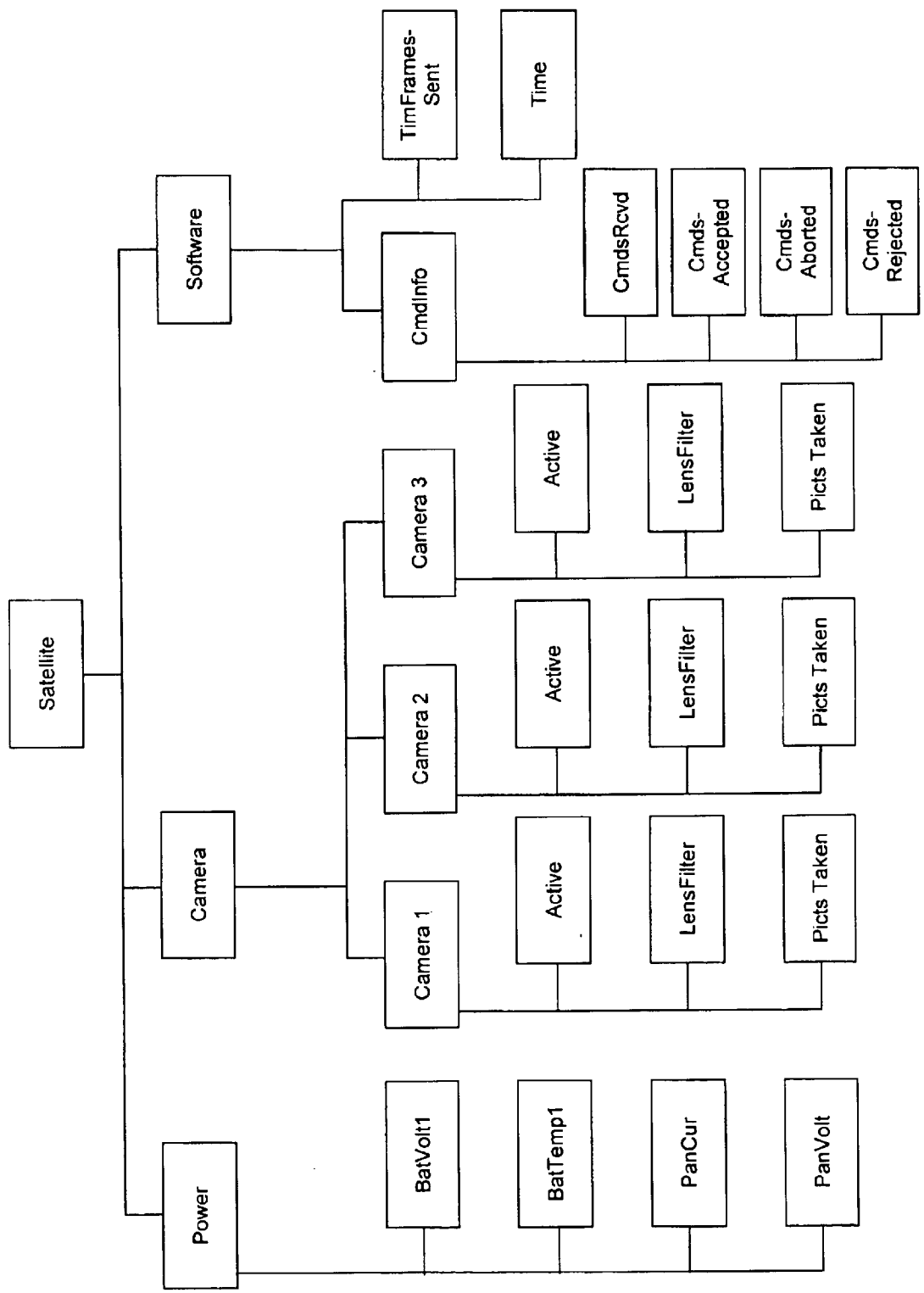
FIG. 7 is an example of a graphical user display which can be generated with the present invention.

The following example includes a hierarchical model which does include symbol range limitations for defining fault conditions. A satellite system can be defined which is being monitored by telemetry or some other form of communication. There are several variables which the vehicle provides to a ground station for analyzing its state as follows:

1. A Power Subsystem
    Primary battery voltage
    Primary battery temperature
    Solar Panel Charging Current
    Solar Panel Voltage
2. Three cameras, each with:
    Camera On/Off
    Lens Filter
    Pictures Taken
3. Software Information
    Commanding
        Commands Received
        Commands Accepted
        Commands Aborted
        Commands Rejected
    Telemetry Frames Sent
    Current Time Given these subsystems, a model can be built using the present invention for containing this information as shown in FIG. 6. On line 5 of the model in FIG. 6, a PanCur symbol representing panel current is set to a critical low limit of 85.3 mA and a critical high limit of 100.0 mA. The low and high warning states for PanCur are set to 90 mA and 95 mA, respectively. The PanVolt symbol on line 6 representing panel voltage has a defined range limit of 75 to 80 volts. Finally, CmdsRejected symbol on line 23, which identifies the number of commands rejected, has a single high end limit of 100. The resulting hierarchy in the system is shown in FIG. 7.

Figure 8:
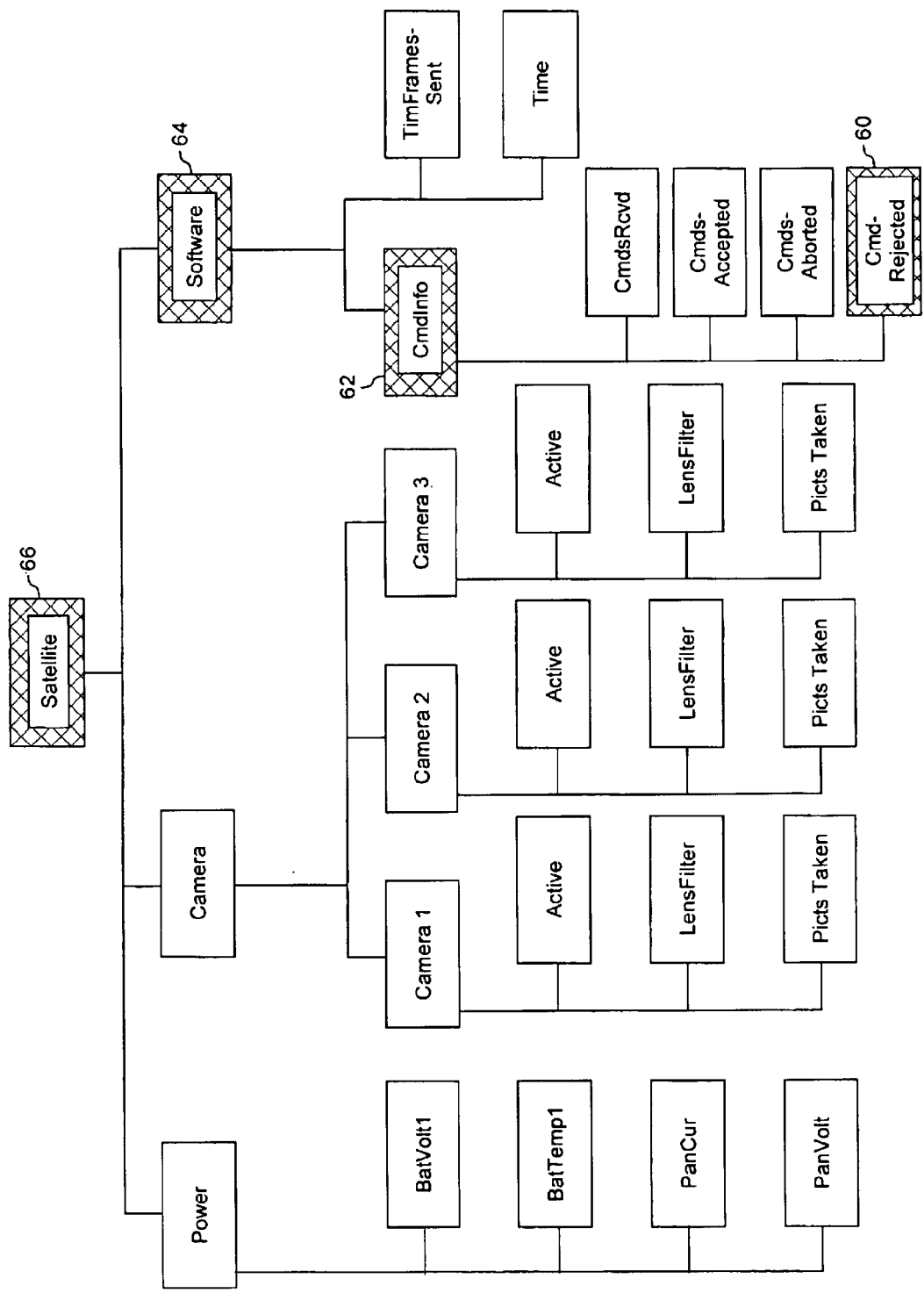
FIG. 8 shows the graphical user display of FIG. 7 wherein a symbol state is critical.

Continuing with the foregoing example, FIG. 8 shows that if the CmdsRejected variable 60 exceeds 100, then something is awry and the satellite operator needs to address the problem. As shown in FIGS. 7 and 8, the child-to-parent path for this symbol is:
    CmdsRejected
        CmdInfo
            Software
                Satellite (root element)

Therefore propagating this error condition involves informing the CmdInfo 62, Software 64, and Satellite elements 66. This state can be reflected by a change in appearance of selected leaves of the hierarchical display. For example, if state change is designated by color, the system could be configured so that red=critical, yellow=warning, and white=nominal. For convenience in FIGS. 8–11, cross hatching is used to represent these changes of appearance as shown to reflect a warning or critical state.

Figure 9:
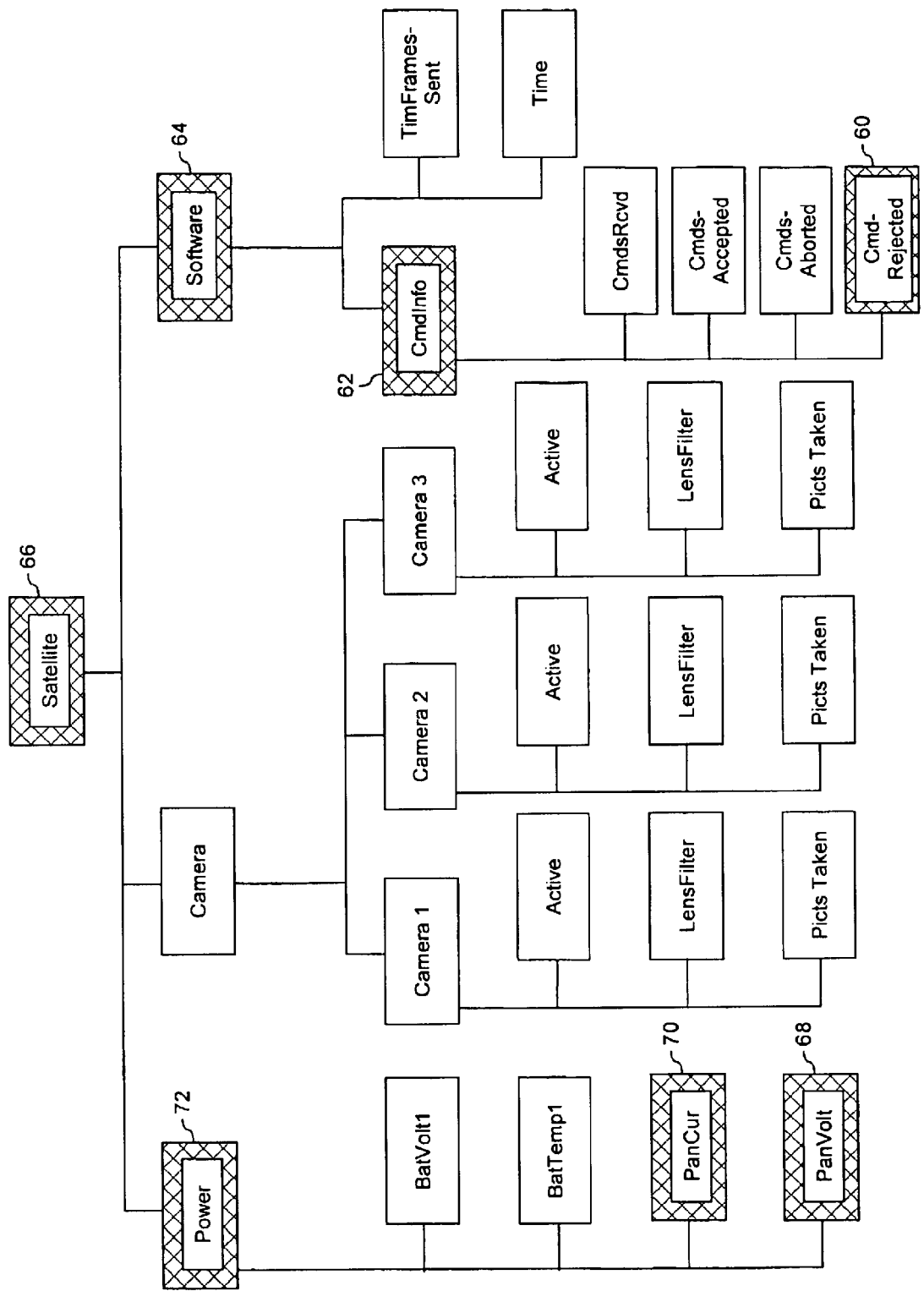
FIG. 9 shows the graphical user display of FIG. 7 wherein symbol states show a critical and warning status.

Continuing on with the foregoing example, if the symbol PanCur 70 goes into warning and PanVolt 68 goes into critical, then the appearance of the hierarchical tree will be as shown in FIG. 9. Single line hatching reflects the warning state of PanCur 70 in FIG. 9, but it will be readily appreciated that a warning color such as yellow could also be used. Note that in FIG. 9, the power 72 subassembly block becomes critical, since this is the worst state of any of its children.

Figure 10:
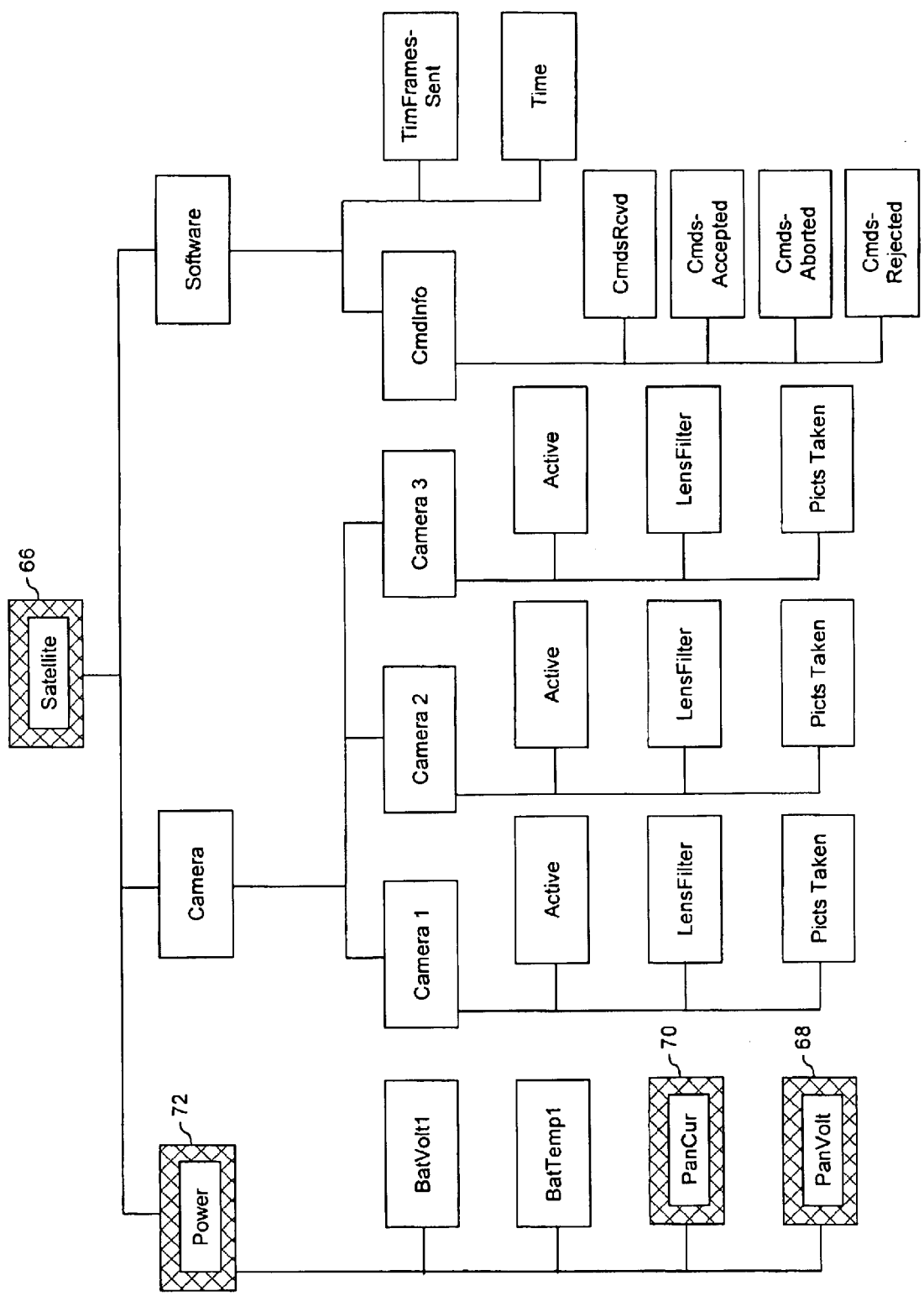
FIG. 10 shows the graphical user display of FIG. 9 after some of the symbol states are no longer critical.

Still referring to the foregoing example, if the CmdsRejected symbol 60 is reset back to 0 (the error condition resolved) the Satellite element 66 remains critical since it still has a critical child. Thus, FIG. 10 illustrates the Satellite element remaining of an appearance which reflects that its state is critical.

Figure 11:
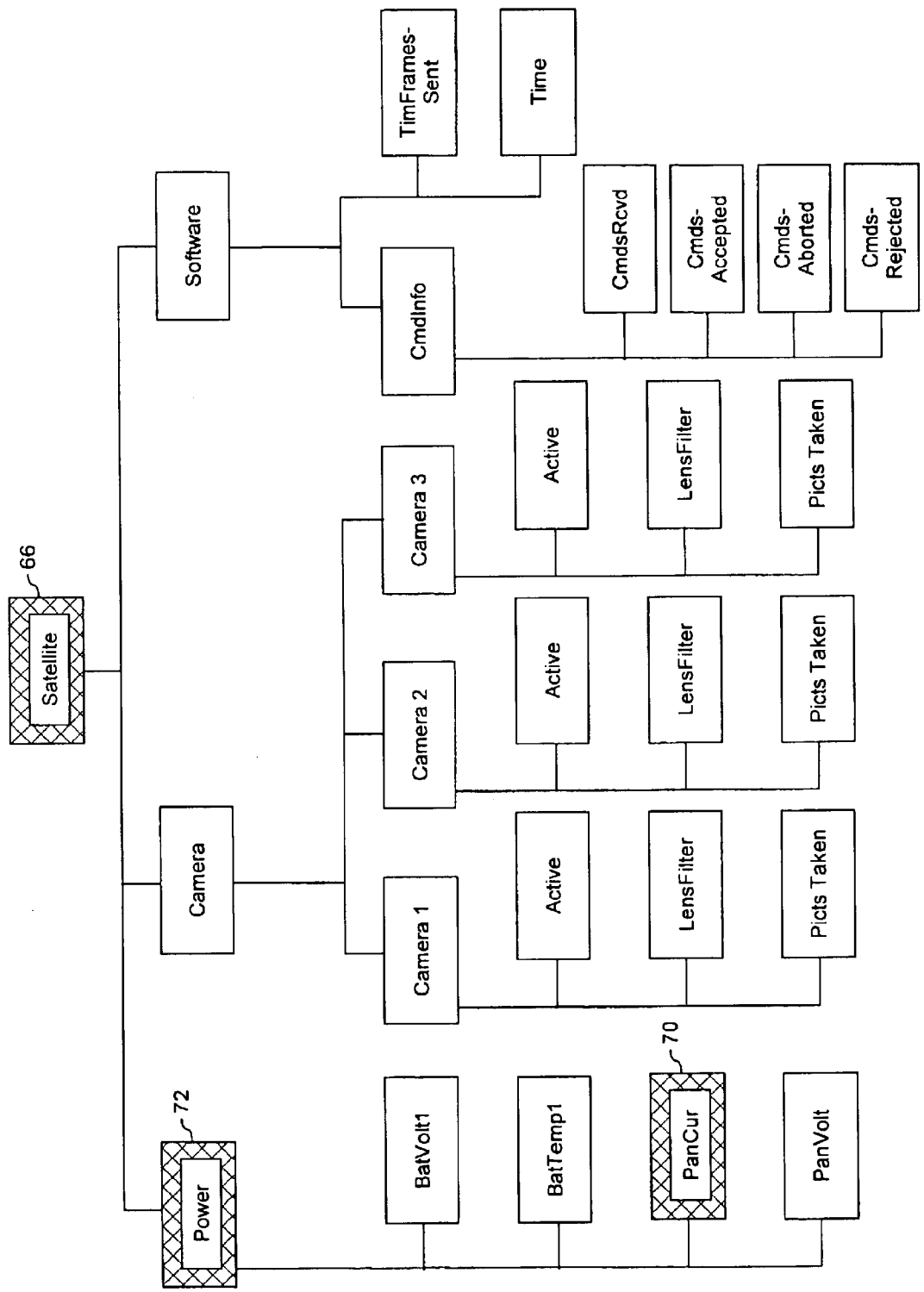
FIG. 11 shows the graphical user display of FIG. 9 with a single leaf having a warning state.

If the critical problem with PanVolt 68 is corrected, then Satellite 66 and Power 72 will no longer be displayed as having a critical state. However, these elements will continue to inherit their worst child state, which in this case is the PanCur 70 warning state. Thus, FIG. 11 shows that the Satellite 66 and Power 72 elements are each displayed with hatching, which in this example indicates a warning condition. Finally, if the warning condition in PanCur 70 is corrected, the display will revert to that shown in FIG. 7, with all states nominal, which in this example is indicated by a white background.

Figure 13:
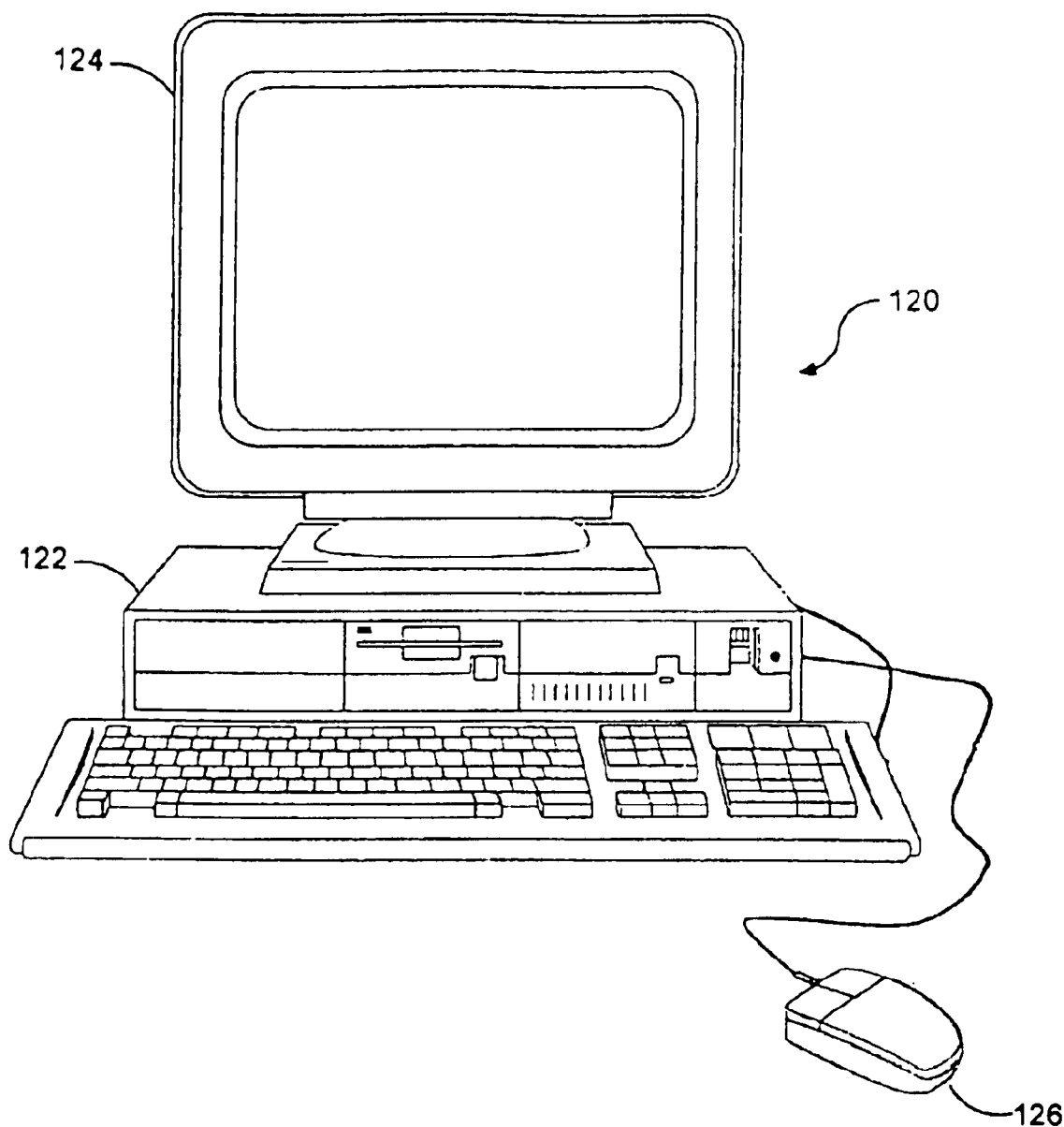
FIG. 13 is an example of a computer for use with the present invention.

FIG. 13 shows a typical computer system 120 for use in conjunction with the present invention. The system is preferably comprised of a general purpose computer 122 including a central processing unit (CPU), one or more memory devices and associated circuitry. The CPU can be comprised of any suitable microprocessor or other electronic processing unit, as is well known to those skilled in the art. An example of such a CPU would include the Pentium or Pentium II brand microprocessor available from Intel Corporation or any other microprocessor having similar capabilities.

The system also preferably includes suitable interface circuitry (not shown) for receiving updated data regarding a plurality of symbols which are to be represented. The interface circuitry can be in the form of a conventional network card or any other interface circuitry appropriate to permit the computer to monitor data generated by a set of physical components. At least one user interface display unit 124 such as a video data terminal (VDT) is preferably operatively connected to the computer 134. An interface device, such as mouse 126, can also be provided with the system, but is not necessary for operation of the invention as described herein. The computer system preferably includes one or more computer memory devices, which can include an electronic random access memory and a bulk data storage medium, such as a magnetic disk drive. The various hardware requirements for the computer system as described herein can generally be satisfied by any one of many commercially available high speed general purpose personal computers offered by manufacturers such as International Business Machines Corporation (IBM), Compaq, Hewlett Packard, or Apple Computers.

In a preferred embodiment which shall be discussed herein, the operating system for computer 134 is one of the Windows family of operating systems, such as Windows NT or Windows 98 which are available from Microsoft Corporation of Redmond, Wash. However, the system is not limited in this regard, and the invention may also be used with any other type of computer operating system such as UNIX. The system as disclosed herein can be implemented by a programmer, using commercially available development tools for the operating systems described above.

Figure 14:
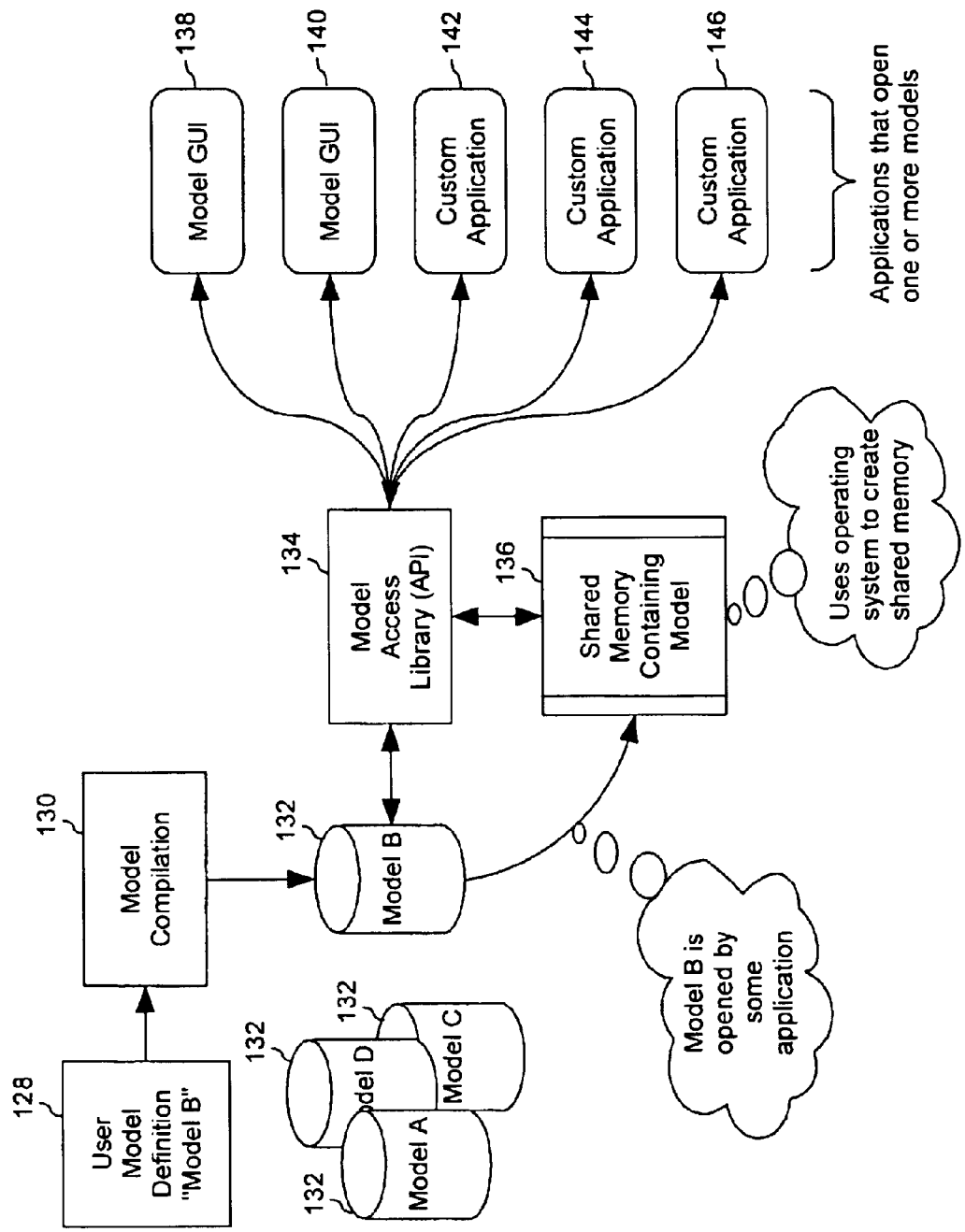
FIG. 14 is an example of a high level architecture for the present invention.

FIG. 14 shows a high level architecture according to a preferred embodiment of the invention. A user creates a user model 128 to define a hierarchical data structure as described relative to FIG. 6. The hierarchical data structure is compiled in block 130 and preferably stored as a binary coded machine readable model 132. Models 132 can be created for any number of different devices and sytems. These o compiled models are then stored as shown in shared memory 136.

Model access library API 134 can access models 132 from shared memory 136. Using the models 132, the model access library API 134 can continually update the state of each symbol defined by the model as shall hereinafter be discussed relative to FIG. 12.

Figure 12:
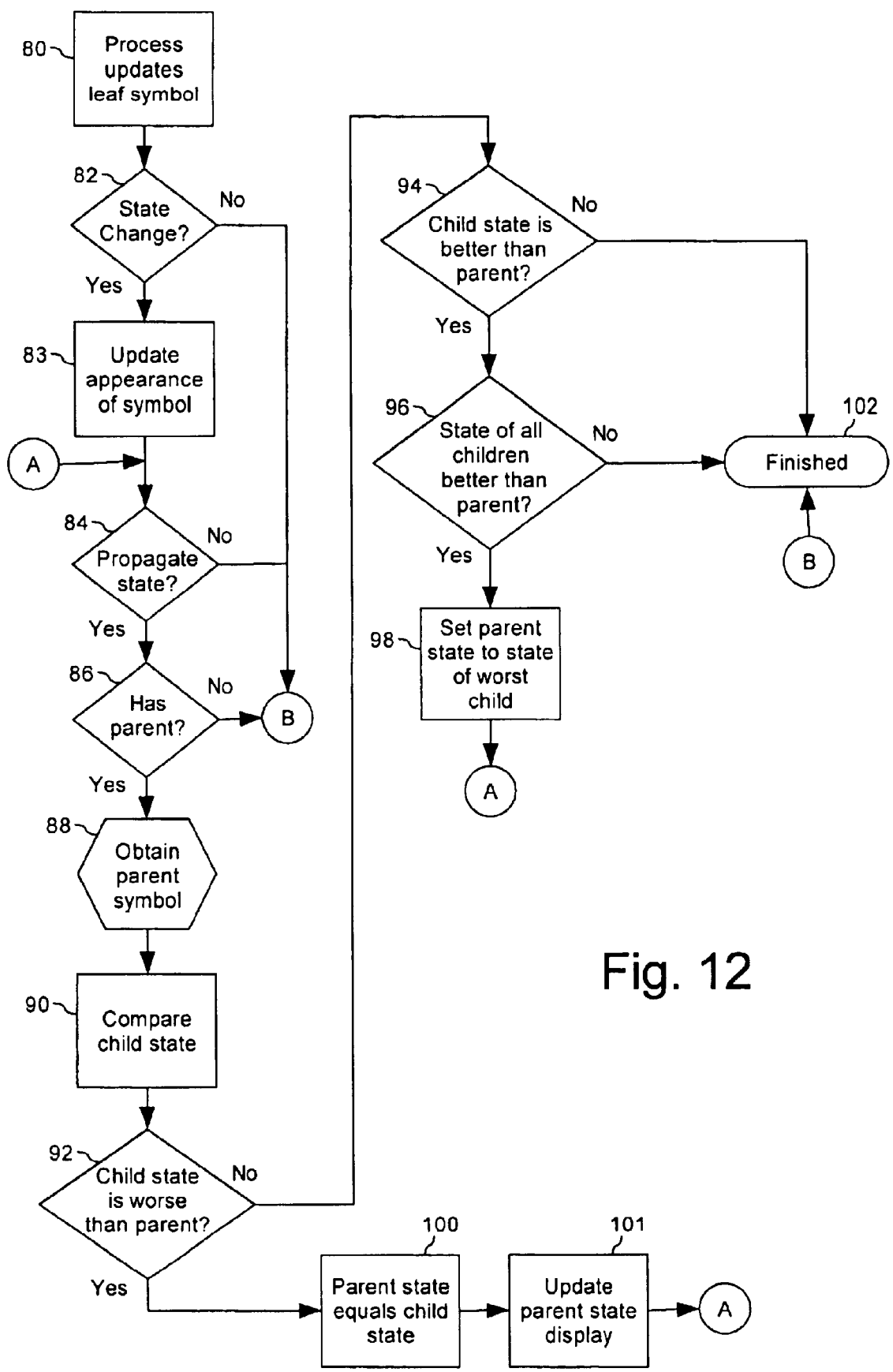
FIG. 12 is a flowchart for a process of updating a graphical user display to propagate the state of a leaf symbol to a root.

FIG. 12 is a flow chart which illustrates a preferred process for a model access library API 134 to update a set of symbol states as shown in FIGS. 7–11. The process begins in step 80 when a process updates the data for a leaf symbol such as battery voltage 20 in FIG. 1. In step 82, a determination is made as to whether a state change has occurred as a result of the update. Such a state change will result if the parameters assigned to a directive or language command are such that the updated value is outside of a predetermined range or meets some other defined state change condition. If not, the process is completed in step 102 and the system waits for the next leaf symbol update. However, if the updated leaf symbol is found to result in a state change in step 82, then the system proceeds to update the appearance of the leaf symbol and goes on to step 84. A determination is made in step 84 as to whether the parameter for the language command or directive used to define the particular symbol is set to cause the state of the child or leaf symbol to propagate to its parent. The default condition will always result in a child state being propagated to a parent.

In step 86, the system verifies that the symbol has a parent. If so, the system obtains the parent symbol in step 88 and compares its state to the child symbol state in step 90. In step 92, if the child state has a more severe fault condition as compared to its parent, then the state of the parent is updated to conform to the state of the child in step 100 and its appearance is updated in step 101. The process then loops back to step 84 and steps 84, 86, 88, 90 and 92 of the process are repeated for the parent symbol until the root of the hierarchical tree is reached.

In step 92, if the child state does not have a more severe fault condition as compared to the state of its parent, then the system proceeds on to step 94 where a determination is made as to whether the child state is better than the parent. If not, then the process ends in step 102.

In step 94, if the child state is better than the state of the parent, then the system determines whether all children of the particular parent also have a state condition which is better than that of the parent. If not, then the process is complete and the state of the parent remains unchanged. If, however, in step 96 a determination is made that the state of all of a parent's children are better than the state of the parent, then the system proceeds on to step 98. In step 98, the state of the parent is upgraded so that it is equal to the state of its child having the most severe fault condition.

Subsequent to step 98, the system loops back to step 84 to continue upwardly propagating the state of the parent node to the next higher level, which could be the root of the hierarchical structure or the next higher level parent. In any case, the process continues until there are no more parent nodes to update in step 86 or the propagate parameter of a parent node is set so that its state will not be propagated.

Referring again to FIG. 14, when a user needs to display dynamic state representation information for a particular system for which a model 132 has been created, he can do so by making use of one or more applications 138, 140, 142, 144, and 146. According to a preferred embodiment, these applications can be generic model graphical user interfaces (GUI) 138, 140 which will request from model access library API 134 a state of each symbol. Alternatively, the application may be a custom written applications 142, 144, 146 which have been specifically designed for displaying or making other use of state data for a particular system which is to be modeled.

The model GUI preferably requests from model access library API the identification and state of a root node of the hierarchical data structure. Thereafter it will proceed to request the identification and state data for each child and leaf node defined by the model 132. This hierarchy and the related state information for each symbol can then be displayed by the model GUI as shown for example in FIGS. 7–11. Thus, the state of any custom system can be dynamically represented in a graphical manner. Custom code can operate similarly, or the state data may be presented and used in alternative manners.

Significantly, if a generic model graphical user interface is used, a major advantage is achieved. In particular, the dynamic graphical representation of the present system can be achieved without the need for any custom computer code. Instead, a user merely needs to provide a script such as the one shown in FIG. 6, which represents their particular system. This is an important advantage for those who are attempting to efficiently and inexpensively provide a dynamic graphical representation of a variety of different complex system. For example, the system can have particular advantage when it is used for permitting a variety of different satellite systems to be monitored by various users.

In any case, the application 138, 140, 142, 144, 146 can request the model access library API 134 to provide dynamic state representation using the model 132 which has been stored in shared memory 136. The model access library API 134 will use the model 132 to generate automatically updated state representation data for the model. This state representation data is provided to the generic model graphical user interfaces (GUI) 138, 140 or other custom GUI application 142, 144, 146. As symbol data is updated, the model access library API 134 preferably continually updates the states of all of the symbol representations comprising the defined model 132 as described relative to FIG. 12. The sybol state data is then preferably displayed by the generic browser 138, 140 as shown in the system view of FIG. 2 or in FIGS. 1–7.

The system according to the invention can make use of an integrated telemetry process for decoding telemetry or can be provided with updated symbol data directly from some other source. In the case where an integrated telemetry process is used, telemetry from a satellite or other device to be monitored can be fed to the model in the form of messages from a user written application. The user code preferably obtains a frame of data and forwards it to the telemetry process. From this point, the telemetry process analyzes the frame of data and updates all the appropriate leaf variables with new values. In an alternative embodiment, the user may write customized software to write a new value to any leaf node variable in the hierarchical model which has been defined using the language and syntax of the invention. In either embodiment, the model updates its hierarchy by propagating any state conditions.

We claim:

1. A method for dynamically representing the state of any device which comprises a plurality of sub systems, the method comprising the steps:

defining a hierarchical data structure comprised of a plurality of leaves, each of said leaves representing a node associated with at least one of a system and a sub system of said device;

defining at least one of said leaves as a parent symbol in said hierarchical data structure, said parent symbol representing a parent node which is higher in said hierarchy than at least one other of said nodes;

defining at least one of said leaves as a child symbol in said hierarchical data structure, said child symbol representing a child node which is lower in said hierarchy than said parent node and having a data type which automatically propagates a state condition for said child symbol to a corresponding one of said parent symbols;

in response to updated data received for said child symbol, automatically determining an updated state of said child symbol based upon said updated data and automatically propagating said updated state to said parent symbol; and automatically updating said parent symbol to reflect said updated state.

2. The method according to claim 1 further comprising the step of displaying a graphical representation of said hierarchical data structure and automatically modifying the appearance of said parent symbol when said updated state propagated to said parent symbol is worse than an existing state of said parent symbol.

3. The method according to claim 2 wherein said parent symbol has a plurality of child symbols which are each represented by at least one additional leaf in said hierarchical data structure, said method further comprising the step of automatically comparing said existing state of said parent symbol to the state of each child symbol if said updated state propagated to said parent symbol Is better than an existing state of said parent symbol.

4. The method according to claim 3 further comprising the step of automatically setting said appearance of said parent symbol to reflect a state of its worst child symbol if the state of all said child symbols are better than said existing state of said parent symbol.

5. The method according to claim 1 wherein said data type automatically propagates to a corresponding parent symbol a data time stamp for updated child symbol data.

6. The method according to claim 1 wherein said data type automatically propagates to a corresponding parent symbol a flag associated with updated child symbol data.

7. The method of claim 1, wherein said parent symbol has a data type which automatically propagates a second state condition to a corresponding second parent symbol higher in said hierarchy than said parent symbol.

8. The method of claim 7, further comprising the step of said parent symbol automatically propagating said second state condition to said second parent after said automatically updating step.

9. The method of claim 1, wherein said automatically generating step comprises generating a state condition for each of a plurality of child symbols.

10. The method of claim 9, wherein said automatically determining step comprises automatically determining said updated state of said parent symbol based upon said state conditions for said plurality of child symbols.

11. The method of claim 1 wherein said parent node is associated at least one of a system and a sub system of a satellite.

12. A system for dynamically representing the state of any device comprising a plurality of sub systems, comprising:

modeling means for defining a hierarchical data structure comprised of a plurality of leaves, each of said leaves representing a node associated with at least one of a system and a sub system of said device, at least one of said leaves being defined as a parent symbol in said hierarchical data structure, said parent symbol representing a parent node which is higher in said hierarchy than at least one other of said nodes, and at least one of said leaves being defined as child symbol representing a child node which is lower in said hierarchy than said parent node, each said child symbol defined in said modeling means by a data type which automatically propagates an updated state condition for said at least one child node to a corresponding one of said parent symbols; and means for automatically updating said parent symbol to reflect said updated state.

13. The system according to claim 12 further comprising:

means for displaying a graphical representation of said hierarchical data structure; and means for automatically modifying the appearance of said parent symbol when said updated state propagated to said parent symbol is worse than an existing state of said parent symbol.

14. The system according to claim 13 wherein said parent symbol has a plurality of child symbols which are each represented by at least one additional leaf in said hierarchical data structure, and further comprising means for automatically comparing said existing state of said parent symbol to the state of each child symbol if said updated state propagated to said parent symbol is better than an existing state of said parent symbol.

15. The system according to claim 14 further comprising means for automatically setting said appearance of said parent symbol to reflect a state of its worst child symbol if the state of all said child symbols are better then said existing state of said parent symbol.

16. The system according to claim 12 wherein said data type automatically propagates to a corresponding parent symbol a data time stamp for updated child symbol data.

17. The system according to claim 12 wherein said data type automatically propagates to a corresponding parent symbol a flag associated with updated child symbol data.

18. A machine readable storage, having stored thereon a computer program having a plurality of code sections executable by a machine for causing the machine to perform the steps of:

defining a hierarchical data structure comprised of a plurality of leaves, each said leaf representing a discrete symbol associated with a sub-system of any device, and a parent symbol representing a level of abstraction of said device which is higher in said hierarchy than said plurality of leaves, each said leaf defined in a modeling means by a data type which automatically propagates a state condition for said leaf to a corresponding one of said parent symbols;

in response to updated data received for any said leaf symbol, automatically determining an updated state of said leaf symbol based upon said updated data and automatically propagating said updated state to said parent symbol.

19. The machine readable storage of claim 18 further comprising the step of displaying a graphical representation of said hierarchical data structure and automatically modifying the appearance of said parent when said updated state propagated to said parent is worse than an existing state of said parent.

20. The machine readable storage of claim 19 further comprising the step of automatically updating the appearance of said leaf when said updated state of said leaf is different from an existing state.

21. The machine readable storage of claim 19 wherein said parent has at least one child which is comprised of at least one additional leaf in said hierarchical data structure, said method further comprising the step of automatically comparing said existing state of said parent to the state of each child if said updated state propagated to said parent is better than an existing state of said parent.

22. The machine readable storage of claim 21 further comprising the step of automatically setting said parent state to the state of its worst child if the state of all said children are better than said existing parent states.

23. The machine readable storage of claim 18 wherein said data type automatically propagates to a corresponding parent a data time stamp for updated leaf symbol data.

24. The machine readable storage of claim 18 wherein said data type automatically propagates to a corresponding parent a flag associated with updated leaf symbol data.

* * * * *